(12) United States Patent
Heu

(10) Patent No.: US 11,973,865 B2
(45) Date of Patent: Apr. 30, 2024

(54) DEVICE AND METHOD OF STORING A SEED PHRASE

(71) Applicant: Michael Heu, Walnut Creek, CA (US)

(72) Inventor: Michael Heu, Walnut Creek, CA (US)

( * ) Notice: Subject to any disclaimer, the term of this patent is extended or adjusted under 35 U.S.C. 154(b) by 615 days.

(21) Appl. No.: 17/194,110

(22) Filed: Mar. 5, 2021

(65) Prior Publication Data

US 2021/0194687 A1 Jun. 24, 2021

(51) Int. Cl.
| | |
|---|---|
| *H04L 9/08* | (2006.01) |
| *B42D 25/20* | (2014.01) |
| *B42D 25/305* | (2014.01) |
| *G06Q 20/36* | (2012.01) |
| *H04L 9/06* | (2006.01) |

(52) U.S. Cl.
CPC ............ *H04L 9/0869* (2013.01); *B42D 25/20* (2014.10); *B42D 25/305* (2014.10); *G06Q 20/36* (2013.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 2018/0083932 A1* | 3/2018 | Adams | ................ | H04L 63/0435 |
| 2019/0280864 A1* | 9/2019 | Cheng | .................... | H04L 9/3247 |
| 2019/0362340 A1* | 11/2019 | Strong | ................ | G06Q 20/3674 |
| 2020/0076592 A1* | 3/2020 | Kong | ..................... | H04L 9/0869 |
| 2020/0234296 A1* | 7/2020 | Vanham | .................... | H04L 9/50 |
| 2020/0389306 A1* | 12/2020 | Dolan | ................... | H04L 9/3252 |
| 2021/0409213 A1* | 12/2021 | Lu | ......................... | H04L 9/0897 |

FOREIGN PATENT DOCUMENTS

| | | | |
|---|---|---|---|
| IN | 201821037878 A | * | 11/2018 |
| WO | WO-2020110077 A1 | * | 6/2020 |

OTHER PUBLICATIONS

"Amazon.com Keystone Indestructible Steel Crypto Cold Storage Seed Backup, pp. 3-7, 2019." (Year: 2019).*

* cited by examiner

*Primary Examiner* — Christopher B Robinson
(74) *Attorney, Agent, or Firm* — Barry Choobin; Patent 360

(57) ABSTRACT

A physical device for safely and securely storing a seed phrase of a crypto wallet or like cryptographic services. The device having cover plates that can sandwich several grid plates, wherein the cover plates and the grid plates are swively bind together using a fastener. Each grid plate is having a grid of columns and rows. Each column is having several sub-columns. Each sub-column having ten rows for the numeral sequence 0-9. Each word of the seed phrase in its corresponding numerical code can be encoded on the grid.

11 Claims, 6 Drawing Sheets

| RECOVERY PHRASE (1-12) | | | | | |
|---|---|---|---|---|---|
| 1 | ALIEN | 0 | 0 | 5 | 1 |
| 2 | NORTH | 1 | 2 | 0 | 3 |
| 3 | SATOSHI | 1 | 5 | 3 | 2 |
| 4 | BIRD | 0 | 1 | 8 | 1 |
| 5 | DEPEND | 0 | 4 | 7 | 2 |
| 6 | CROWD | 0 | 4 | 1 | 9 |

Fig. 6

DEVICE AND METHOD OF STORING A SEED PHRASE

FIELD OF INVENTION

The present invention relates to a device and method for storing a seed phrase, and more particularly, the present invention relates to a device and method for backing up a seed phrase that allows access to a cryptocurrency wallet.

BACKGROUND

Crypto wallet, also known as a cryptocurrency wallet, stores cryptographic keys that track the ownership and transactions in cryptocurrency. Most of the known Crypto wallets are secured through cryptographic keys, wherein the wallets can generate a seed phrase, seed recovery phrase, or backup seed phrase to recover the key associated with the wallet. The seed phrase includes a list of words through which the wallet can create all the public and private keys. The wallet generates the recovery seed phrase for the user's record. The seed phrase is like a key to the wallet and must be safely stored by a user. When the user installs the wallet again, the seed phrase is needed for gaining access to the cryptocurrency.

Thus, safe, and secure storage of the seed phrase is important. Users generally write the seed phrase on paper which can be easily lost or spoiled. Similarly, storing the seed phrase on electronic memory, such as computer memory or removable storage may not be safe because of risks of hacking or hardware failure. Many people lost their hard-earned money in the form of cryptocurrency because they forgot the password or loses the seed phrase. Thus, considering the rise in popularity of the cryptocurrency, a desire is there for a safe and secure back-up of the seed phrase.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

FIG. 6 shows an exemplary embodiment of the template sheet, according to an exemplary embodiment of the present invention.

DETAILED DESCRIPTION OF THE INVENTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a device for safely and securely storing a seed phrase of a crypto wallet or like cryptographic services. Currently, the known crypto wallets produce the seed phrase having about 12-24 words, however, any number of words are within the scope of the present invention. The disclosed device is compact that can be easily concealed and securely stored. Moreover, the device does not degenerate with time, is fireproof and corrosion resistant.

Figure 1:
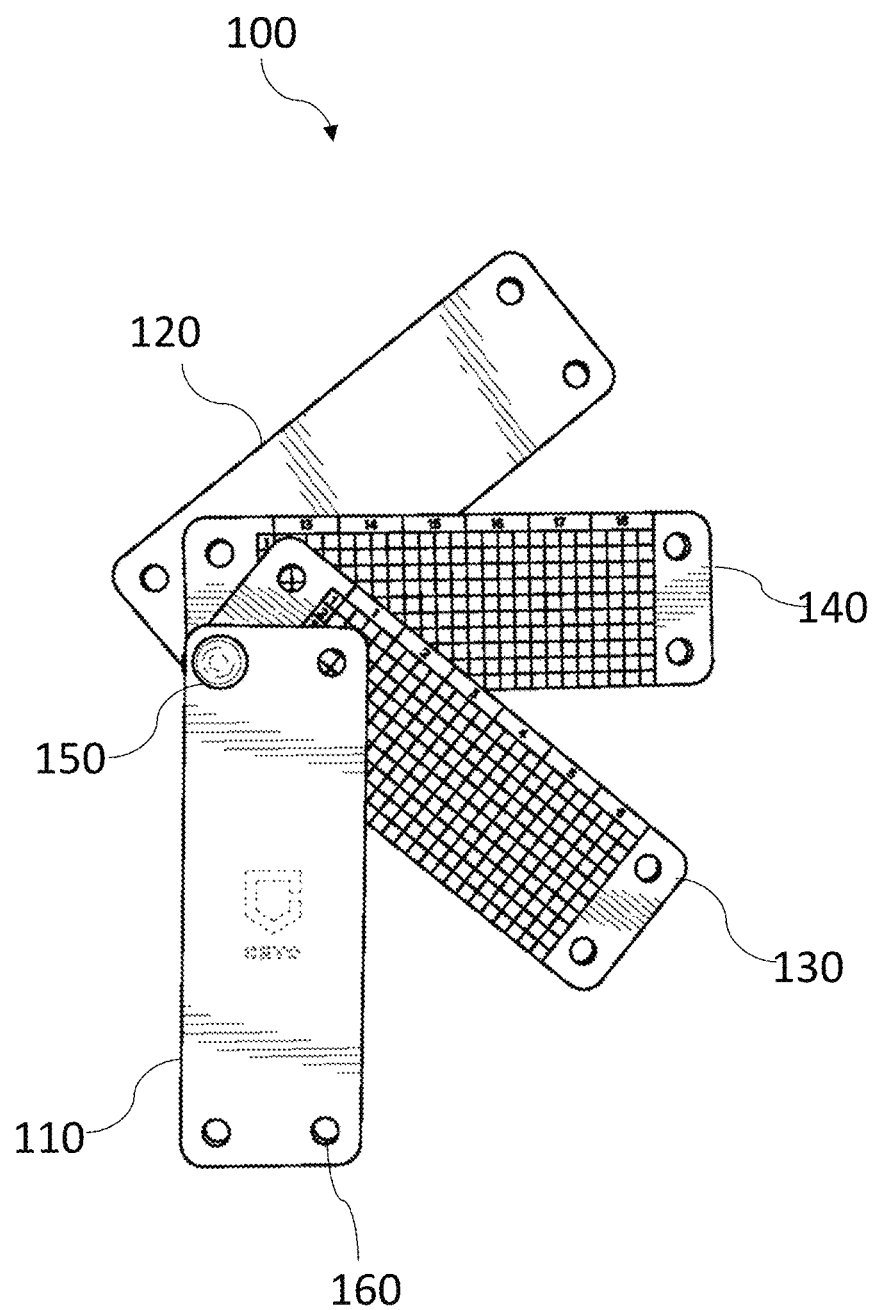
FIG. 1 is a perspective view of the device showing the cover plates and the grid plates, according to an exemplary embodiment of the present invention.

Referring to FIG. 1, which shows an exemplary embodiment of the disclosed device. The device 100 can have two cover plates that sandwich several grid plates. FIG. 1 shows a front cover plate 110 and a rear cover plate 120. Two grid plates i.e., the first grid plate 130 and the second grid plate 140 are sandwiched between the front cover plate 110 and the rear cover plate 120. The cover plates and the grid plated are bound together using a fastener 150, such as each plate can swivel relative to the other plates. Each cover plate and the grid plate are having at least two holes at corners, wherein one hole is for the fastener. The other hole can be used to secure the plates, such as using a lock or another fastener to secure the grid plates and the data encoded on the grid plates. FIG. 1 shows four holes 160 at the four corners, wherein the top-left corner is having a post screw swively binding the four plates. All the four holes can be fastened using the post screws securing the grid plates between the cover plates. Alternatively, at least two locks can be provided at opposite corners for securing the grid plates. The locks can be key lock, combination lock, and like locks known to a skilled person.

Each plate of the device can be made of a metal, such as stainless steel or titanium that is of high-strength and corrosion-resistant. The data encoded on the disclosed grid plates made of metal becomes permanent and perpetual. Any metal or alloy that is both of high strength and corrosion-resistant can be used without departing from the scope of the present invention. The two cover plates i.e., the front plate and the rear plate protect the inner grid plates which have the encoded seed phrase.

Figure 2:
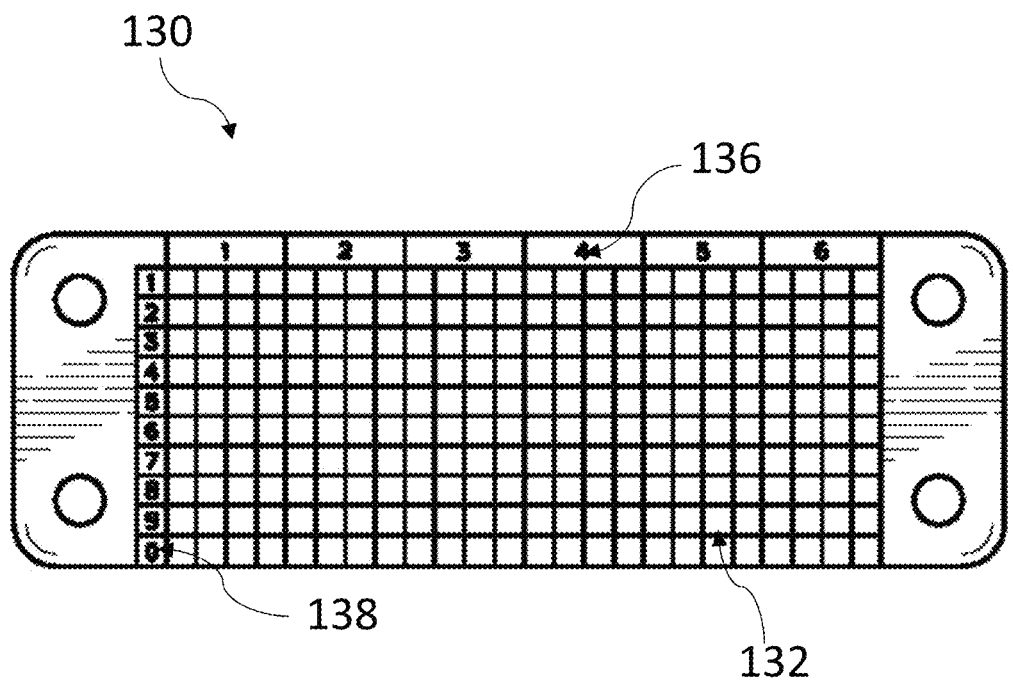
FIG. 2 is a front face of a first grid plate, according to an exemplary embodiment of the present invention.

Referring to FIG. 2-5 which shows both sides of the inner grid plates. FIG. 2 shows the front face 132 of the first grid plate 130. The grid plate is having a grid pattern that includes the rows and columns. The grid having a column header 136 and a row header 138. The grid pattern is based on a type of wordlist used for generating the seed phrase. For example, FIG. 2 shows the grid pattern for a standard BIP39 wordlist. A skilled person will understand that a different wordlist can be used for generating the seed phrase, and all such wordlists are within the scope of the present invention. The disclosed device can be modified according to the type of wordlist/algorithm used for generating the seed phrase. Moreover, one or more grid plates can be provided based on the number of words in the seed phrase. FIGS. 2-5 shows the grid plates for a seed phrase having 12-24 words.

Figure 3:
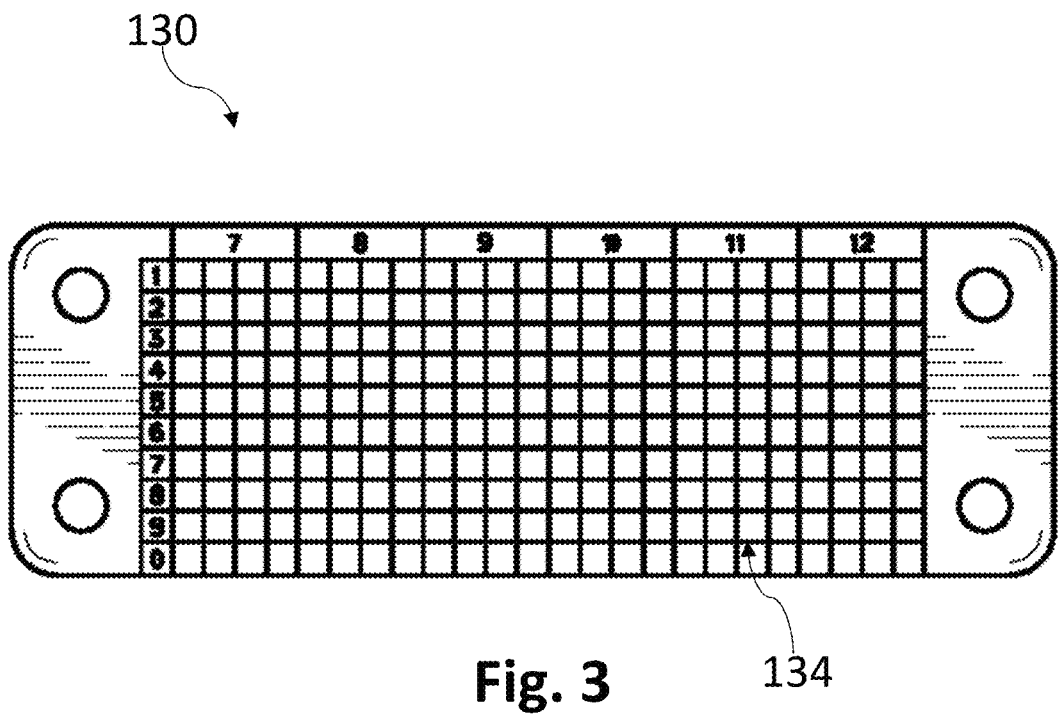
FIG. 3 is a rear face of the first grid plate, according to an exemplary embodiment of the present invention.
Figure 4:
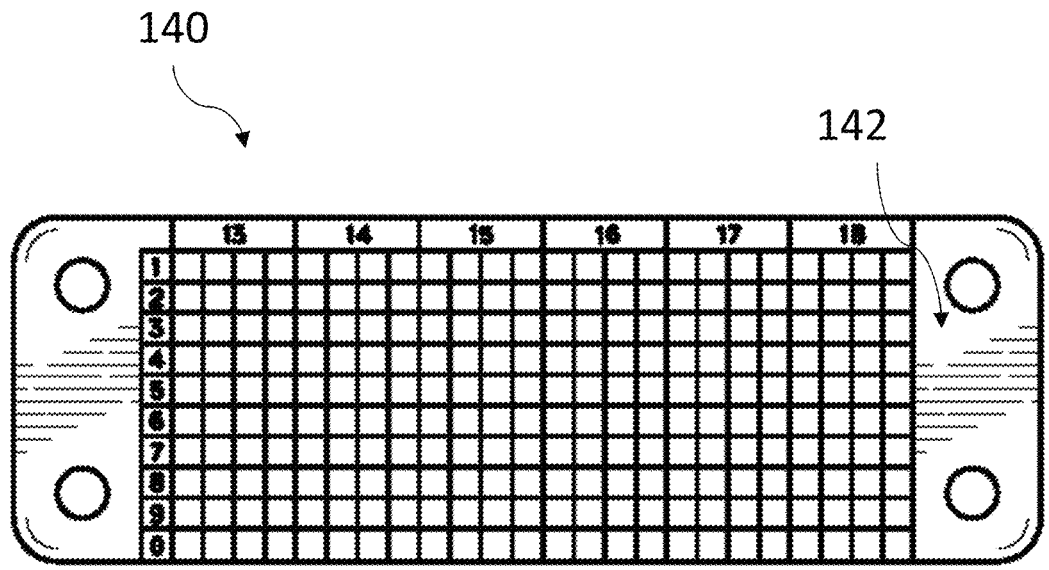
FIG. 4 is a front face of a second grid plate, according to an exemplary embodiment of the present invention.

Each column in the grid represents a word/BIP39 number in order. The front face 132 is having six columns for six words in order. The rear face 134, shown in FIG. 3, is also having six columns for the next six words in order. The front face 142 of the second grid plate 140, shown in FIG. 4, is having six columns for the next six words in order. Lastly, the rear face 144 of the second grid plate 140 is having six columns for the last six words in order i.e., words 19 to 24 in the list of words. Each column has four sub-columns for a four-digit BIP39 number. Each sub-column has ten rows that represent the number 0-9. The surface of the grid plate can be punched with a punch tool, for example, a cell of the grid can be punched to encode the data. The cell herein refers to an intersection of a column and row of the grid.

In one aspect, disclosed is a kit and method of use thereof. The kit can include the above device 100, a punch tool, template sheets, and a BIP39 word list. The punch tool can be a pen-shaped tool having a sharp pointer. The pointer of the punch tool can be pressed against the surface of the grid plate, cutting away a thin layer of metal, creating a grove. The sharp pointer can create a contrasting grove in a cell of the grid.

Figure 5:
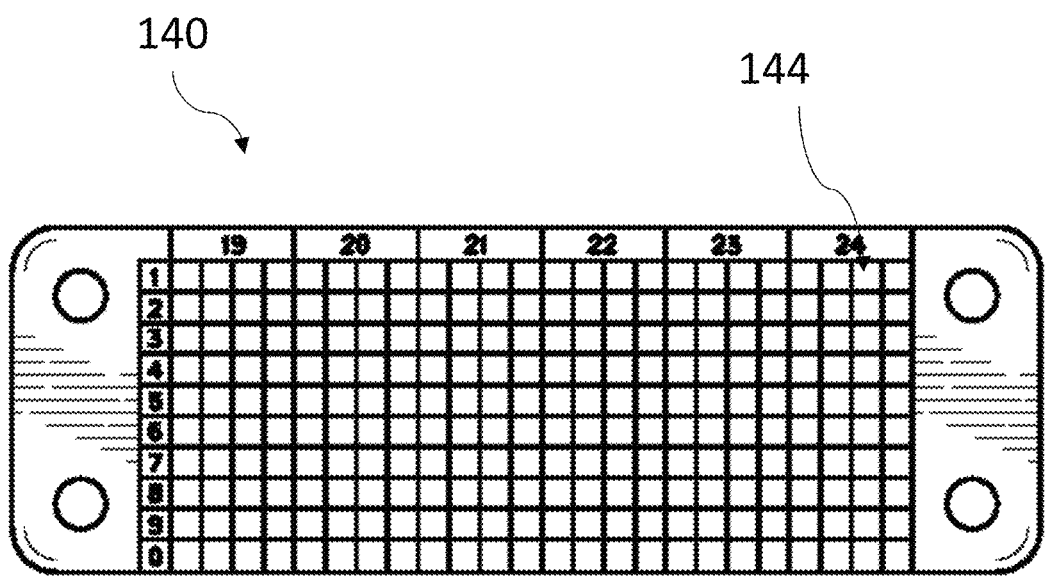
FIG. 5 is a rear face of the second grid plate, according to an exemplary embodiment of the present invention.

An exemplary embodiment of the template sheet is shown in FIG. 5. Such a sheet can be optional but provide convenience in backing-up the seed phrase. Shown is the template sheet for 12 words seed phrases. Two such sheets can be provided each having six consecutive rows. Each row starts with a numeral, which is the order of the word in the seed phrase. This numeral in the row of the template sheet also corresponds to a numeral in the column header of the grid. A first word of the seed phrase can be written in-order in the first column of the row. Thereafter the corresponding BIP39 number for each word can be found from the standard BIP39 word list. Such a BIP39 wordlist is available and distributed unchanged in the standard format. Thereafter, the corresponding BIP39 number can be written against each word. A BIP39 number is a four-digit unique number for each word in the word list.

Figure 7:
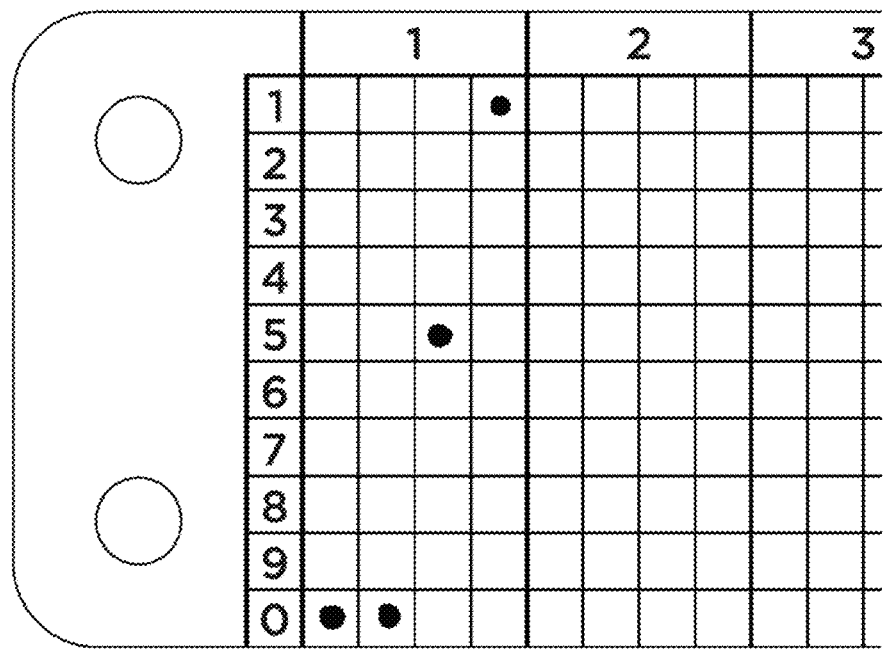
FIG. 7 shows an enclosed grid plate, wherein the first word is encoded in the first column of the grid, according to an exemplary embodiment of the present invention.

Also, disclosed is a kit and method of use thereof in encoding the seed phrase on the disclosed device. First, the seed phrase can be generated, from a standard word list or algorithm. The seed phrase can optionally be verified to ensure that the words are correct. The words can be written on the provided template sheets, as shown in FIG. 6. The words should be written in the same order as in the seed phrase if the order is important. Thereafter, the numeric code of each word can be looked into the standard word list. For example, the words based on the BIP39 standard list can be looked onto the list for the four-digit code. The code can be written against each word in the row against the corresponding word, also shown in FIG. 6. The words can now be encoded on the grid plates of the device. Each column in the grid represents a word and the sub-columns can be used to record the numeric code associated with the word. Each cell in the column represents a number. Optionally, first, the numbers can be marked on the grid plated using a pointed pen/marker and the marks can then be punched. It minimizes the chances of error in punching the correct cell. However, such as step is optional, and the cells can be punched directly. FIG. 7 shows the first word "ALIEN" in the template list (shown in FIG. 6) encoded on the first column "1" of the grid. The code associated with the word "ALIEN" is "0051". Digits 0, 0, 5, and 1 are marked in related rows as shown in FIG. 7. The numbering of the column in the header i.e., 1, 2, 3 . . . , n is the order of the words in the seed phrase. Ten rows represent numerals 0-9, which can be used to represent digits in the numeral code. The number of sub-columns can be increased or decreased depending upon the numerals in the code. Finally, using the punch tool, each cell can be punched to form a permanent groove. The grid plates can then be closed and optionally secured. For example, additional screws or locks can be fastened to other holes of the device.

It is to be understood that the Figures show a device and method for encoding a seed phrase related to a cryptocurrency, however, any information that can be represented in numeral codes can be encoded on the disclosed device. Also, the device can be modified for encoding alphanumeric codes, such as passwords. Additionally, the plates can be separated and stored separately, so that the complete seed phare cannot be stolen. Additional cover plates and rivets can be provided in the kit for storing the grid plates separately. Also, FIG. 1 shows four holes, the number of holes can be varied without departing from the scope of the present invention.

Figure 8:
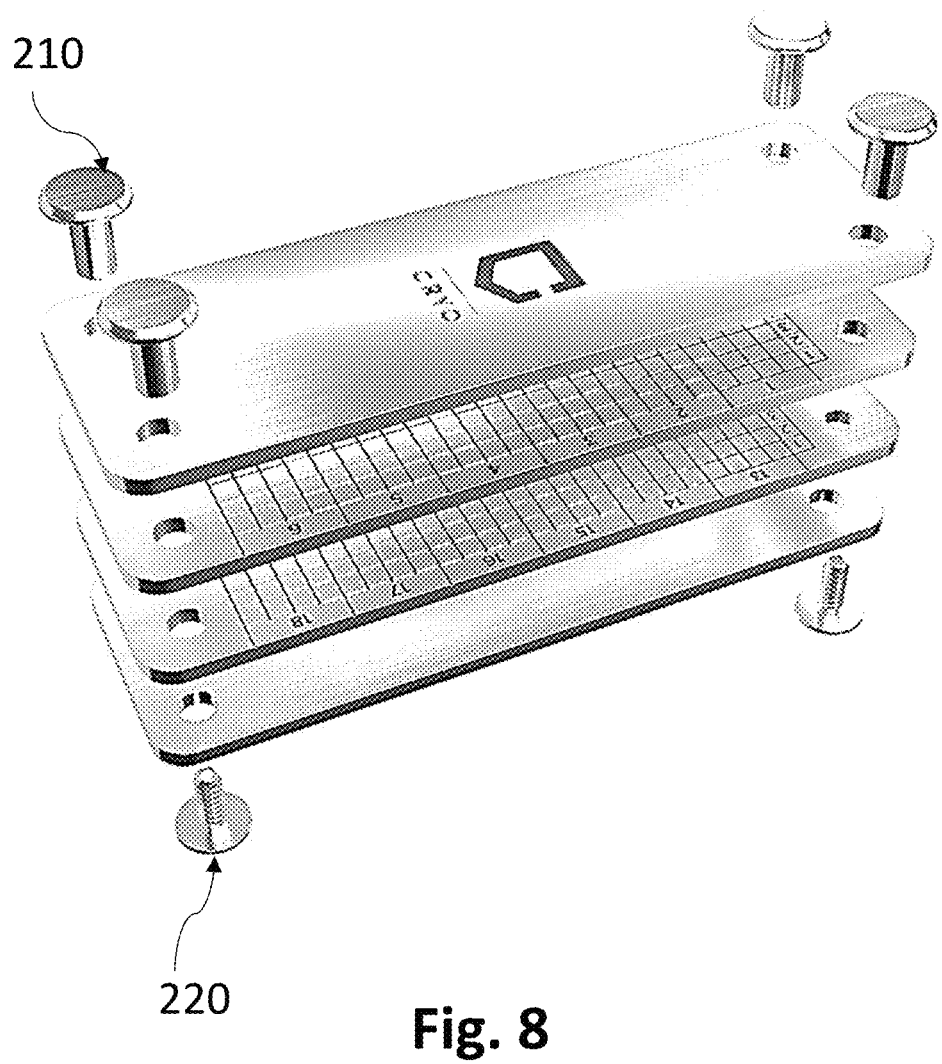
FIG. 8 shows an exploded view of the disclosed device having four fasteners, according to an exemplary embodiment of the present invention.

Referring to FIG. 8 which shows an exploded view of the device. The device having two grid plates covered by two cover plates. Each having four holes at the four corners. After encoding the information on the grid plates, the grid plates can be secured using the fasteners. FIG. 8 shows four post screws securing the four corners. It is to be noted that the grid and the grid headers are engraved in the metal plates to protect from loss of information during fire, water, or other damage. Also, it is to be understood that the disclosed device can be used to store confidential information, such as pin and passwords. The row headers and the column headers can have alphabets, numerals, symbols, and like depending upon the information to be encoded.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for storing a seed phrase comprising the steps of:
   receiving a seed phrase, wherein the seed phrase is having a list of words, the seed phrase related to a standard word list; and
   providing a device, the device comprising:
      one or more grid plates, each grid plate is having a grid, the grid having a plurality of columns, each column having a plurality of sub-column, each sub-column is having ten rows, the ten rows having a row header with a printed numeral sequence from 0 to 9, the plurality of columns having a column header, the column header having a printed numeral sequence in ascending order starting from one, wherein the printed numeral sequence of the column header and the printed numeral sequence of the row header defines an address of a cell in the grids,
      a front cover plate, and
      a rear cover plate,
      wherein each of the front cover plate, the rear cover plate, and the one or more grid plates has a first hole at a proximal end portion of the device, the first hole configured to receive a fastener, the fastener is for releasably and swivels binding the front cover plate, the rear cover plate, and the one or more grid plates,
      wherein each of the front cover plate, the rear cover plate, and the one or more grid plates has a second hole at a distal end portion of the device, wherein the second hole is configured to receive a lock for securing the device;
   retrieving, from the standard word list, a numerical code associated with each word of the seed phrase, the numerical code having a predefined number of digits;
   encoding, each word of the seed phrase, using a punching tool, on the grids of the one or more grid plates in order as the order of the list of words, each word is represented by one column of the plurality of columns.

2. The method according to claim 1, wherein the standard word list is a BIP39 word list, wherein each column has four sub-columns.

3. The method according to claim 1, wherein each of the grid plate has a front face and a rear face, each of the front face and the rear face has the grid.

4. The method according to claim 2, wherein the numerical code is marked by punching a groove on a surface of the grid plate.

5. The method according to claim 3, wherein the seed phrase has 12-24 words, each of the grid plates have six columns, the device having two grid plates together has 24 total columns.

6. The method according to claim 1, wherein the grid, the row header, and the column header are engraved on a surface of the one or more grid plates.

7. A device for storing information in numeral form, the device comprising:
   one or more grid plates, each grid plate having a grid, the grid having a plurality of columns, each column having a plurality of sub-columns, each sub-column having ten rows, the ten rows having a row header with printed numeral sequence, the plurality of columns having a column header, the column header having a printed numeral sequence, wherein the printed numeral sequence of the column header and the printed numeral sequence of the row header define an address of a cell in the grid;
   a front cover plate, and
   a rear cover plate,
   wherein each of the front cover plate, the rear cover plate, and the one or more grid plates has a first hole at a proximal end portion of the device, the first hole configured to receive a fastener, the fastener is for releasably and swivels binding the front cover plate, the rear cover plate, and the one or more grid plates,
   wherein each of the front cover plate, the rear cover plate, and the one or more grid plates has a second hole at a distal end portion of the device, wherein the second hole is configured to receive a lock for securing the device.

8. The device according to claim 7, wherein the front cover plate and the rear cover plate are configured to protect the one or more grid plates.

9. The device according to claim 7, wherein the front cover plate, the rear cover plate, and the one or more grid plates are made of corrosion-resistant metal.

10. The device according to claim 7, wherein the grid, the row header, and the column header are engraved on a surface of the one or more grid plates.

11. The device according to claim 7, wherein each of the grid plates has six columns, the device comprises two grid plates having total twenty-four columns, and each column has four sub-columns.

* * * * *